US012012762B1

(12) United States Patent
Hinojosa et al.

(10) Patent No.: US 12,012,762 B1
(45) Date of Patent: Jun. 18, 2024

(54) DEPLOYABLE AWNING FOR PROTECTION FROM STORM DAMAGE

(71) Applicant: UIPCO, LLC, San Antonio, TX (US)

(72) Inventors: Cynthia Ann Hinojosa, Selma, TX (US); Andrew Jacob Contreras, San Antonio, TX (US); Lemont Williamson, San Antonio, TX (US); Igor Alexandre Gregorio, San Antonio, TX (US); Stephen Anthony Young, Boerne, TX (US); Jonathan Edward Seaton, San Antonio, TX (US); Chris Aaron Bodden, San Antonio, TX (US); Shirley Elizabeth Bunton, San Antonio, TX (US); Shayna Dickson, Boerne, TX (US); Ric M. Pena, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 449 days.

(21) Appl. No.: 17/245,424

(22) Filed: Apr. 30, 2021

Related U.S. Application Data

(60) Provisional application No. 63/018,165, filed on Apr. 30, 2020.

(51) Int. Cl.
*E04F 10/06* (2006.01)
*G05D 3/10* (2006.01)

(52) U.S. Cl.
CPC ........... *E04F 10/0659* (2013.01); *G05D 3/10* (2013.01)

(58) Field of Classification Search
CPC .............................. E04F 10/0659; G05D 3/10
See application file for complete search history.

(56) References Cited

U.S. PATENT DOCUMENTS

| 2,802,694 | A | * | 8/1957 | Murray | .................. | B60J 7/1273 |
| | | | | | | 318/470 |
| 5,307,856 | A | * | 5/1994 | Murray | ............... | E04F 10/0688 |
| | | | | | | 160/310 |
| 5,368,056 | A | * | 11/1994 | Riggi, Jr. | ................ | B60P 3/343 |
| | | | | | | 160/67 |

(Continued)

FOREIGN PATENT DOCUMENTS

| CN | 108824868 | A | * | 11/2018 | .............. | E04F 10/02 |
| CN | 109208974 | A | * | 1/2019 | | |

(Continued)

*Primary Examiner* — Johnnie A. Shablack
(74) *Attorney, Agent, or Firm* — Plumsea Law Group, LLC

(57) ABSTRACT

A system and a method for a deployable awning that detects impending storms or other weather events and automatically deploys from a structure to extend out and cover vehicles to protect them from damage due to the storm or other weather event. In one embodiment, a method includes determining that an activating event has occurred. The activating event includes a storm or other weather event. Upon determining that the activating event has occurred, the method includes automatically deploying an awning from a stored configuration inside an awning housing to a deployed configuration such that the awning covers a coverage area of a ground surface adjacent to a location where the awning housing is mounted.

19 Claims, 10 Drawing Sheets

(56) References Cited

U.S. PATENT DOCUMENTS

| | | | |
|---|---|---|---|
| 6,341,638 B1 * | 1/2002 | Thompson | E04F 10/08 |
| | | | 160/67 |
| 6,484,069 B2 * | 11/2002 | Osinga | E04F 10/0688 |
| | | | 318/16 |
| 6,983,783 B2 * | 1/2006 | Carmen, Jr. | H05B 47/17 |
| | | | 160/176.1 P |
| 7,152,652 B2 * | 12/2006 | Heitel | E04F 10/0659 |
| | | | 160/310 |
| 7,242,162 B2 * | 7/2007 | Goth | E04F 10/0659 |
| | | | 700/275 |
| 7,472,739 B2 * | 1/2009 | Heidenreich | E04F 10/0681 |
| | | | 160/265 |
| 7,562,928 B1 * | 7/2009 | Morazan | B60J 11/00 |
| | | | 296/136.12 |
| 8,042,562 B1 * | 10/2011 | McDaniel, Jr. | E04H 15/008 |
| | | | 52/36.2 |
| 8,061,374 B2 * | 11/2011 | Li | A45B 23/00 |
| | | | 135/96 |
| 8,825,500 B2 * | 9/2014 | DeBartolo, III | F24S 25/00 |
| | | | 126/621 |
| 9,047,758 B2 * | 6/2015 | Robinson | G08C 23/04 |
| 9,382,747 B1 * | 7/2016 | Anderson | H04L 12/2803 |
| 9,483,933 B1 * | 11/2016 | Anderson | G08B 29/04 |
| 9,815,359 B2 * | 11/2017 | Morazan | B60J 11/04 |
| 9,949,540 B2 * | 4/2018 | Gharabegian | H02S 20/30 |
| 10,094,138 B2 * | 10/2018 | Gharabegian | H04L 12/4625 |
| 10,316,522 B2 * | 6/2019 | Thompson | E04F 10/0633 |
| 10,487,575 B2 * | 11/2019 | Mugnier | E06B 9/40 |
| 10,488,834 B2 * | 11/2019 | Gharabegian | G10L 15/28 |
| 10,700,633 B2 * | 6/2020 | DeBartolo, III | F24S 25/00 |
| 10,947,736 B2 * | 3/2021 | Thompson | E06B 9/68 |
| 11,458,821 B1 * | 10/2022 | Murphy | B60J 11/06 |
| 11,585,111 B2 * | 2/2023 | Mattana | H02S 20/30 |
| 11,658,606 B2 * | 5/2023 | Raghunathan | H02S 30/20 |
| | | | 136/245 |
| 2002/0029534 A1 * | 3/2002 | McKeown | E04H 6/06 |
| | | | 52/174 |
| 2016/0340926 A1 * | 11/2016 | Barbret | E04H 15/28 |
| 2017/0324896 A1 * | 11/2017 | Gharabegian | A45B 17/00 |
| 2018/0102734 A1 * | 4/2018 | Katz | E04F 10/06 |
| 2022/0182009 A1 * | 6/2022 | Poivet | E04B 1/0046 |
| 2023/0243173 A1 * | 8/2023 | Agrikli | E04H 6/22 |
| | | | 414/232 |

FOREIGN PATENT DOCUMENTS

| | | | | |
|---|---|---|---|---|
| CN | 112554621 A | * | 3/2021 | A63C 31/02 |
| CN | 113863771 A | * | 12/2021 | |
| CN | 114187774 A | * | 3/2022 | |
| EP | 2003264 A2 | * | 12/2008 | E04F 10/0659 |
| KR | 200292586 Y1 | * | 10/2002 | |
| KR | 20190059786 A | * | 5/2019 | |
| KR | 102004942 B1 | * | 7/2019 | |
| KR | 102024123 B1 | * | 11/2019 | |
| KR | 20200064429 A | * | 6/2020 | |
| KR | 102152778 B1 | * | 9/2020 | |
| KR | 20210014996 A | * | 2/2021 | |

* cited by examiner

DEPLOYABLE AWNING FOR PROTECTION FROM STORM DAMAGE

This application claims the benefit of U.S. Provisional Patent Application Ser. No. 63/018,165 filed on Apr. 30, 2020 and titled "Deployable Awning for Protection from Storm Damage", the disclosure of which is incorporated by reference in its entirety.

TECHNICAL FIELD

The present disclosure relates to storm protection for vehicles, and more specifically to a system and method for using a deployable awning to protect vehicles from storm damage.

BACKGROUND

Extreme weather events, such as storms or severe rain and wind, are a considerable cause of property losses and damage. In particular, many vehicle owners suffer damage to their vehicles due to the effects of storms. Hail storms may directly cause damage to a vehicle by denting the vehicle panels or chipping the paint. Other types of storms may bring high winds that can cause tree branches or other objects to fall on or impact the vehicle. As a result, insurance claims by vehicle owners due to storm damage can be significant.

There is a need in the art for a system and method that can assist with preventing storm damage to vehicles.

SUMMARY

In one aspect, the disclosure provides a method for automatically deploying an awning in response to a weather event. The method includes determining whether an activating event has occurred. The activating event includes a storm or other weather event. Upon determining that the activating event has occurred, the method includes automatically deploying an awning from a stored configuration inside an awning housing to a deployed configuration such that the awning covers a coverage area of a ground surface adjacent to a location where the awning housing is mounted.

In another aspect, the disclosure provides a system for automatically deploying an awning in response to a weather event. The system includes an awning comprising an awning housing, an awning fabric, and multiple support arms. The awning fabric is stored inside the awning housing in a stored configuration. The system also includes at least one processor associated with the awning. The at least one processor is configured to determine whether an activating event has occurred. The activating event includes a storm or other weather event. Upon determining that the activating event has occurred, the at least one processor is also configured to automatically deploy the awning fabric from the stored configuration inside the awning housing to a deployed configuration such that the awning fabric covers a coverage area of a ground surface adjacent to a location where the awning housing is mounted.

In another aspect, a method for automatically adjusting a vehicle position relative to a coverage area of an awning in response to a weather event is provided. The method includes detecting an initial vehicle position relative to a coverage area of an awning in a deployed configuration. The coverage area of the awning being associated with an indicia on a ground surface adjacent to a location where the awning is mounted. The method includes determining whether the awning fully covers the vehicle. Upon determining that the vehicle is not fully covered by the awning, the method further includes automatically adjusting a position of the vehicle to be completely within the coverage area of the awning.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

The techniques of the example embodiments described herein provide a system and a method for a deployable awning that detects impending storms or other weather events and automatically deploys from a structure to extend out and cover vehicles to protect them from damage due to the storm or other weather event.

Figure 1:
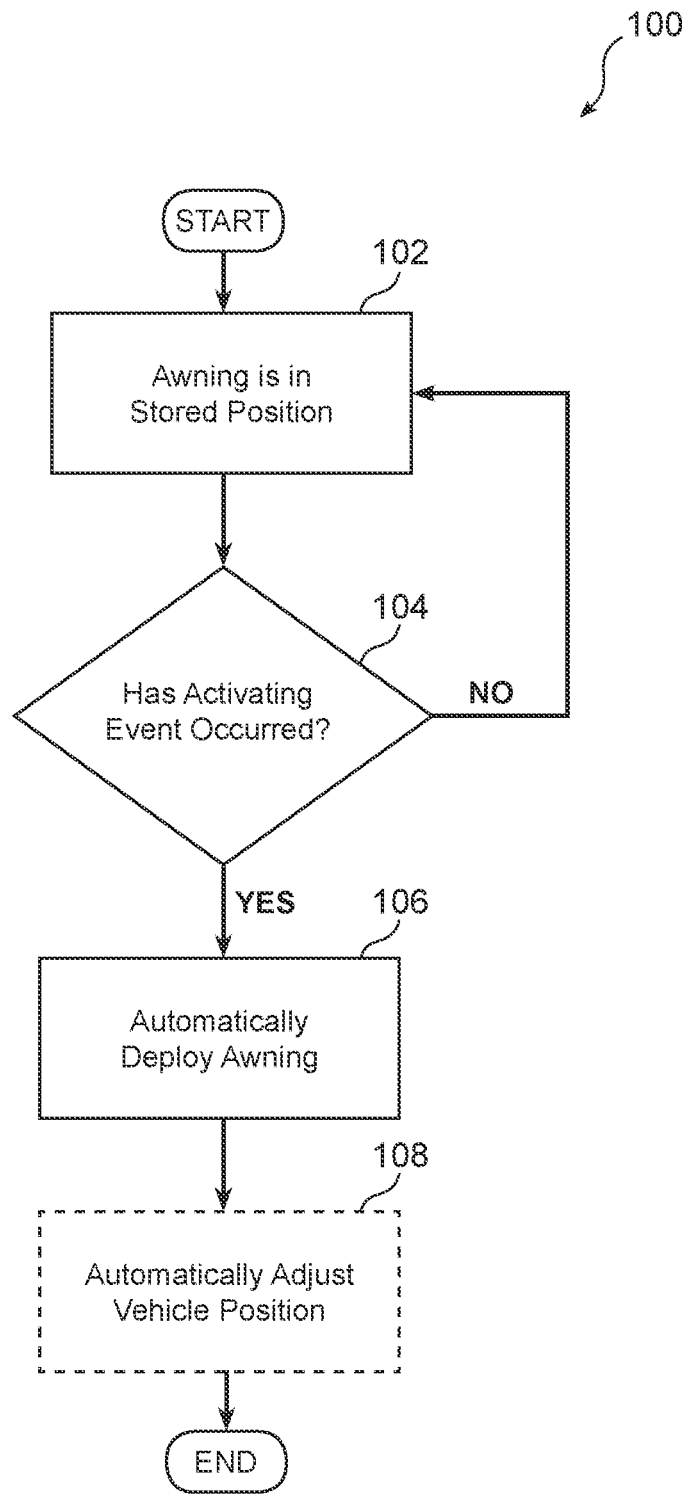
FIG. 1 is a flowchart of an example embodiment of a method of deploying an awning in response to a weather event.

Referring now to FIG. 1, a method 100 of deploying an awning in response to a weather event is shown. In some embodiments, method 100 may be implemented by a computer or other component including a processor. In an example embodiment, a processor may be configured to control a deployable awning installed on a structure to implement method 100. In this embodiment, method 100 begins with an operation 102. At operation 102, a deployable awning is in a stored configuration or position. For example, at operation 102, the deployable awning is not deployed (i.e., is not extended) and may be in the stored position on the structure where it is installed.

Next, method 100 includes an operation 104. At operation 104, whether or not an activating event has occurred is determined. In some embodiments, the activating event may be one or more predetermined conditions or events that will trigger the deployable awning to be deployed (i.e., to be extended). For example, an activating event that may occur at operation 104 can include a storm, such as a hail storm or other storm having rain and/or high winds. Other activating events can include other types of weather events, as well as additional criteria or factors, including one or more of the criteria and/or factors shown and described in reference to FIG. 3 below.

Upon determining at operation 104 that an activating event has not yet occurred (i.e., the decision is NO), then method 100 returns to the beginning where the awning remains in the stored position. In some embodiments, method 100 may be implemented upon satisfaction of a threshold condition, such as, for example, a forecast calling for a storm or other weather event in the geographic area where the awning is installed. In these embodiments, the criteria or factors used to determine the activating event at operation 104 may be associated with a storm or weather event of a greater degree or severity than the threshold condition that initiates method 100. With this arrangement, the threshold condition causes method 100 to be implemented, but the awning is deployed only upon satisfaction of the activating event at operation 104. Thus, upon the negative determination at operation 104, method 100 returns to operation 102.

In some embodiments, a time delay of a predetermined time period may be initiated before method 100 proceeds again to operation 104 to determine whether the activating event has occurred. For example, the predetermined time period may be measured in minutes or hours. Upon expiration of the predetermined time period, then method 100 may again proceed to operation 104 to determine if the activating event has occurred. With this arrangement, method 100 is configured to periodically check on the status of an activating event at operation 104 when there is a forecast of a storm or other weather event in the geographic area where the awning is installed.

Upon determining at operation 104 that an activating event has occurred (i.e., the decision is YES), then method 100 proceeds to an operation 106. At operation 106, the awning is automatically deployed. For example, at operation 106, the deployable awning may be automatically deployed in response to an activating event, such as a storm or other weather event, to extend out and cover a vehicle that is parked or located near where the awning is installed. With this configuration, method 100 may be used to provide protection to the vehicle from hail, failing tree limbs, or other debris that may be propelled by wind from the storm or other weather event.

Additionally, in some embodiments, method 100 may further include an operation 108 that occurs after the awning is deployed at operation 106. In this embodiment, optional operation 108 includes automatically adjusting a vehicle position to be underneath the awning in the deployed position. For example, operation 108 may include the processor configured to implement method 100 to deploy the awning also being in communication with a vehicle near the awning.

At operation 108, the processor may send a request or communication to the vehicle to automatically adjust its position to be better covered by the deployed awning. For example, the vehicle may include an autonomous parking feature that permits the vehicle to move or adjust its position without requiring a human driver. With this arrangement, operation 108 of method 100 may further provide protection for a vehicle from hail or other storm debris by automatically adjusting the vehicle position underneath the deployed awning, thereby protecting the vehicle.

Figure 10:
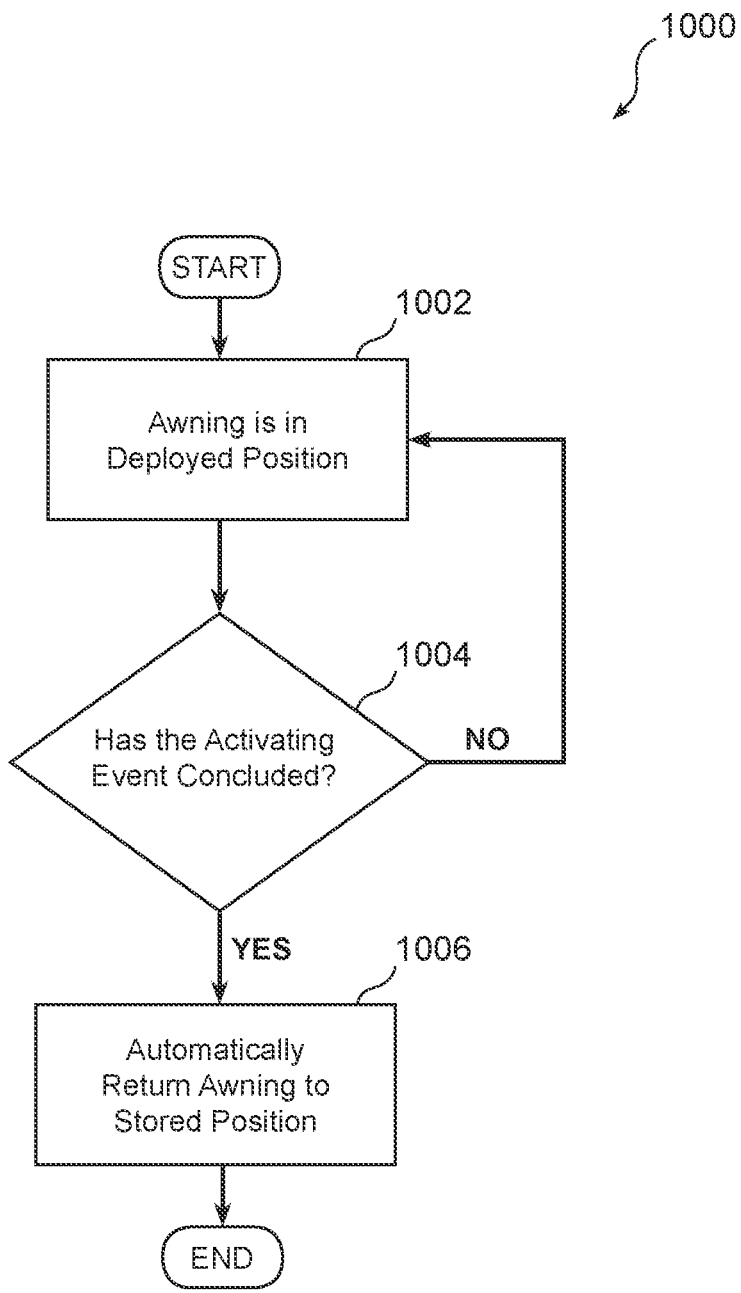
FIG. 10 is a flowchart of an example embodiment of a method of returning an awning to a stored configuration after a weather event.

Upon completion of operation 106 and/or optional operation 108, method 100 may end. It should be understood that method 100 may be implemented multiple times and in response to one or more activating events. In some embodiments, the deployed awning may return to its stored configuration or position, for example, as described in reference to FIG. 10 below.

Figure 2:
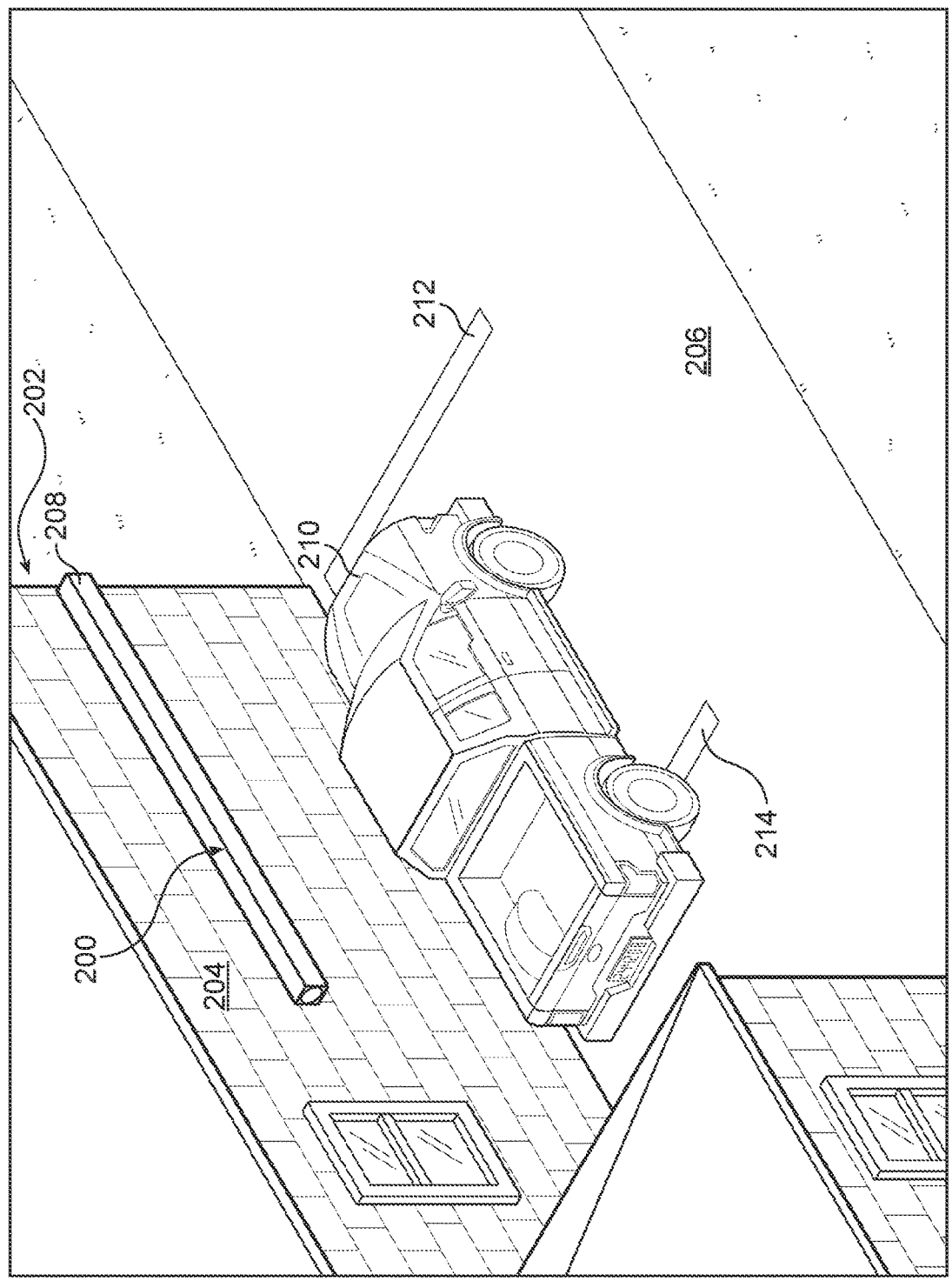
FIG. 2 is a representative view of an example embodiment of a deployable awning installed at a location.

Referring now to FIG. 2, an example embodiment of a deployable awning 200 is shown installed at a location. In some embodiments, a deployable awning according to the techniques described herein may be installed at any type of location, including residential and/or commercial buildings. In other embodiments, a deployable awning may be installed as a stand-alone apparatus that includes scaffolding or other type of support structure. In this embodiment, deployable awning 200 is installed at a house 202 (i.e., a residential building) and is attached to a wall 204. As shown in FIG. 2, deployable awning 200 is mounted or attached to wall 204 of house 202 at a height that is sufficiently spaced apart from the ground surface so that one or more vehicles may fit underneath deployable awning 200 when it is deployed. For example, in one embodiment, deployable awning 200 is mounted to wall 204 approximately seven feet above the ground surface, such as a driveway 206. In other embodiments, deployable awning 200 may be mounted higher or lower so as to accommodate a height of vehicles that are to be covered by deployable awning 200 when in its deployed configuration.

As shown in this embodiment, deployable awning 200 is disposed in a stored configuration or position inside an awning housing 208. Awning housing 208 may be any type of mechanism that is configured to extend and/or retract deployable awning 200 relative to its mounted location on wall 204 of house 202. For example, awning housing 208 may include one or more rollers on which an awning fabric is rolled up in the stored position. The awning housing 208 may further include other components configured to extend and/or retract deployable awning 200, including, but not limited to a motor configured to turn the rollers holding the awning fabric, multiple support arms to hold the awning fabric taut in the deployed configuration or position, and may also include a hand crank to manually operate the rollers. Other components of deployable awning 200 may include sensors, as will be described in reference to the example embodiments below.

In some embodiments, deployable awning 200 may be configured to cover one or more vehicles. For example, as shown in this embodiment, deployable awning 200 is configured to cover a vehicle 210 in the form of a truck. It should be understood, however, that the size and dimensions of deployable awning 200 may be varied to cover vehicles of different sizes, as well as to cover multiple vehicles. In an example embodiment, indicia may be provided on the ground surface to indicate the coverage area of deployable awning when in the deployed configuration or position (i.e., when the awning fabric is extended out from awning housing 208). As shown in FIG. 2, the indicia is in the form of a pair of parking lines, including a first parking line 212 and a second parking line 214, located on driveway 206 adjacent or near wall 204 of house 202 where deployable awning 200 is mounted. In other embodiments, the indicia may take other forms to provide a guide or indication to a user of the coverage area of deployable awning 200.

With this arrangement, a user may park vehicle 210 in driveway 206 between first parking line 212 and second parking line 214 adjacent or near wall 204 of house 202 so that deployable awning 200 may be deployed over vehicle 210 to cover and protect vehicle 210 during a storm or weather event.

Figure 3:
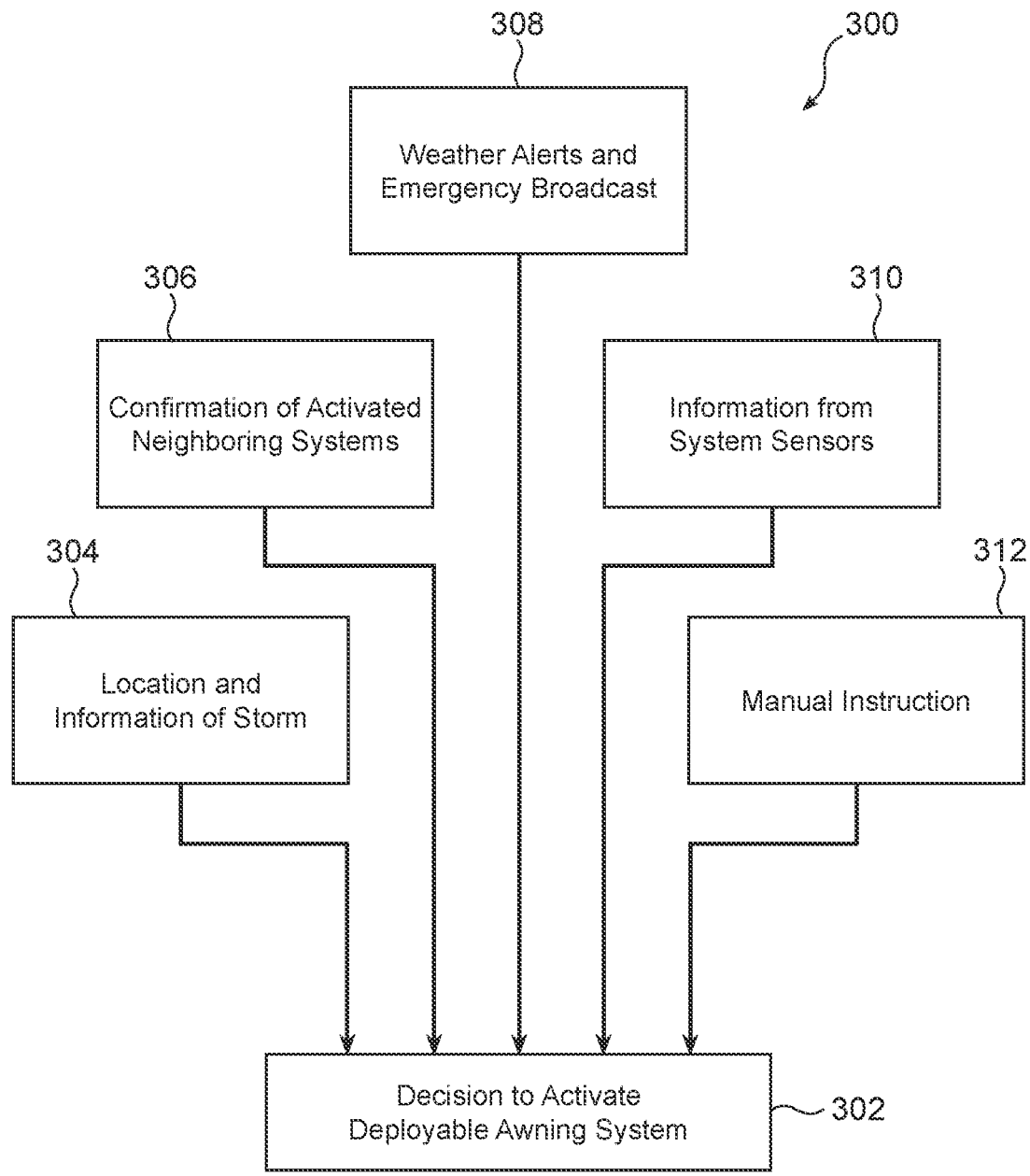
FIG. 3 is a schematic view of a process for evaluating factors to determine whether to deploy an awning.

As described above in reference to method 100, deployable awning 200 is configured to be deployed to cover a vehicle (e.g., vehicle 210) in response to an activating event. For example, operation 104 of method 100 determines whether or not the activating event has occurred. Referring now to FIG. 3, an example embodiment of a process 300 for evaluating factors to determine whether to deploy deployable awning 200 is shown. In some embodiments, process 300 may include one or more factors that may be used to determine whether an activating event has occurred and/or whether deployable awning 200 should be deployed. In some cases, any one single factor may be sufficient to determine an activating event has occurred. In other cases, a predetermined number of factors may be met or satisfied before determining that an activating event has occurred.

In this embodiment, process 300 includes examples of different factors or criteria that may be used to determine that an activating event has occurred (e.g., as part of operation 104, described above). It should be understood, however, that in other embodiments, process 300 and/or operation 104 may include other factors or criteria not explicitly illustrated in FIG. 3. As shown in this embodiment, a decision 302 to activate the deployable awning system may be made based on a plurality of factors or criteria. Once decision 302 has been reached, an activating event is determined to have occurred (e.g., resulting in a YES at operation 104 of method 100).

In an example embodiment, process 300 includes a first factor 304 associated with a location and other information about a storm. For example, first factor 304 may include information indicating that a storm or other weather event is either occurring in a location where deployable awning 200 is located (e.g., the location of house 202 where deployable awning 200 is installed) or, based on the information about the storm or weather event, is headed towards the geographic area of the location where deployable awning 200 is located.

Process 300 may also include a second factor 306 associated with a confirmation from one or more activated neighboring deployable awning systems. For example, second factor 306 may include receiving notifications from other deployable awning systems within a neighborhood or predetermined area of the location where deployable awning 200 is located indicating that those systems have deployed their awnings. That is, in some embodiments, deployable awning 200 may be part of a networked or linked system that includes other deployable awnings that communicate over a communication network that uses any form of wired or wireless communication technology, including, but not limited to cellular telecommunication networks (e.g., 3G, 4G, 5G, LTE, etc.) or other wireless wide-area networks (VVWAN) and/or wireless local-area networks (WLAN). Second factor 306 may use the received notifications from neighboring deployable awning systems to determine that a storm or other weather event is likely headed towards the location where deployable awning 200 is located. In other words, an activating event detected or determined by neighboring awning systems is a strong indicator of an activating event occurring at house 202.

A third factor 308 may be associated with weather alerts and/or emergency broadcasts. In this embodiment, third factor 308 may be less specific than first factor 304, but may still provide some indication that a storm or other weather event is likely or forecast for a more general geographic area that may include the location where deployable awning 200 is located. For example, some weather alerts may be provided to a large geographic region that can include multiple smaller geographic areas.

A fourth factor 310 may be specific information from sensors associated with deployable awning 200. For example, one or more weather sensors, such as an anemometer, wind vane, pressure sensor, thermometer, hygrometer, and/or rain gauge, may be installed on or near deployable awning 200 and are configured to detect and measure information associated with weather conditions at house 202 where deployable awning 200 is installed.

Process 300 may include using information from one or more factors or criteria, including, but not limited to first factor 304, second factor 306, third factor 308, and/or fourth factor 310 to determine whether an activating event has occurred, resulting in decision 302 to deploy deployable awning 200. Additionally, in some embodiments, decision 302 of an activating event may be manually decided by a user providing a manual instruction 312. In some embodiments, manual instruction 312 may be a physical button or other mechanism located near deployable awning 200 that allows the user to manual deploy deployable awning 200. In other embodiments, manual instruction 312 may be provided through an application running on a mobile device of a user (e.g., a mobile phone) that allows the user to manually deploy deployable awning 200 from any location through the user's mobile device.

Upon reaching decision 302 to activate deployable awning 200, deployable awning 200 may be deployed from the stored configuration or position (e.g., inside housing 208) to a deployed configuration or position (e.g., with the awning fabric extended outside of housing 208) to cover one or more vehicles that are adjacent or near deployable awning 200. With this arrangement, deployable awning 200 can protect the covered vehicles from damage caused by the storm or other weather event satisfying the activating event criteria (i.e., determined at operation 104 of method 100).

Figure 4:
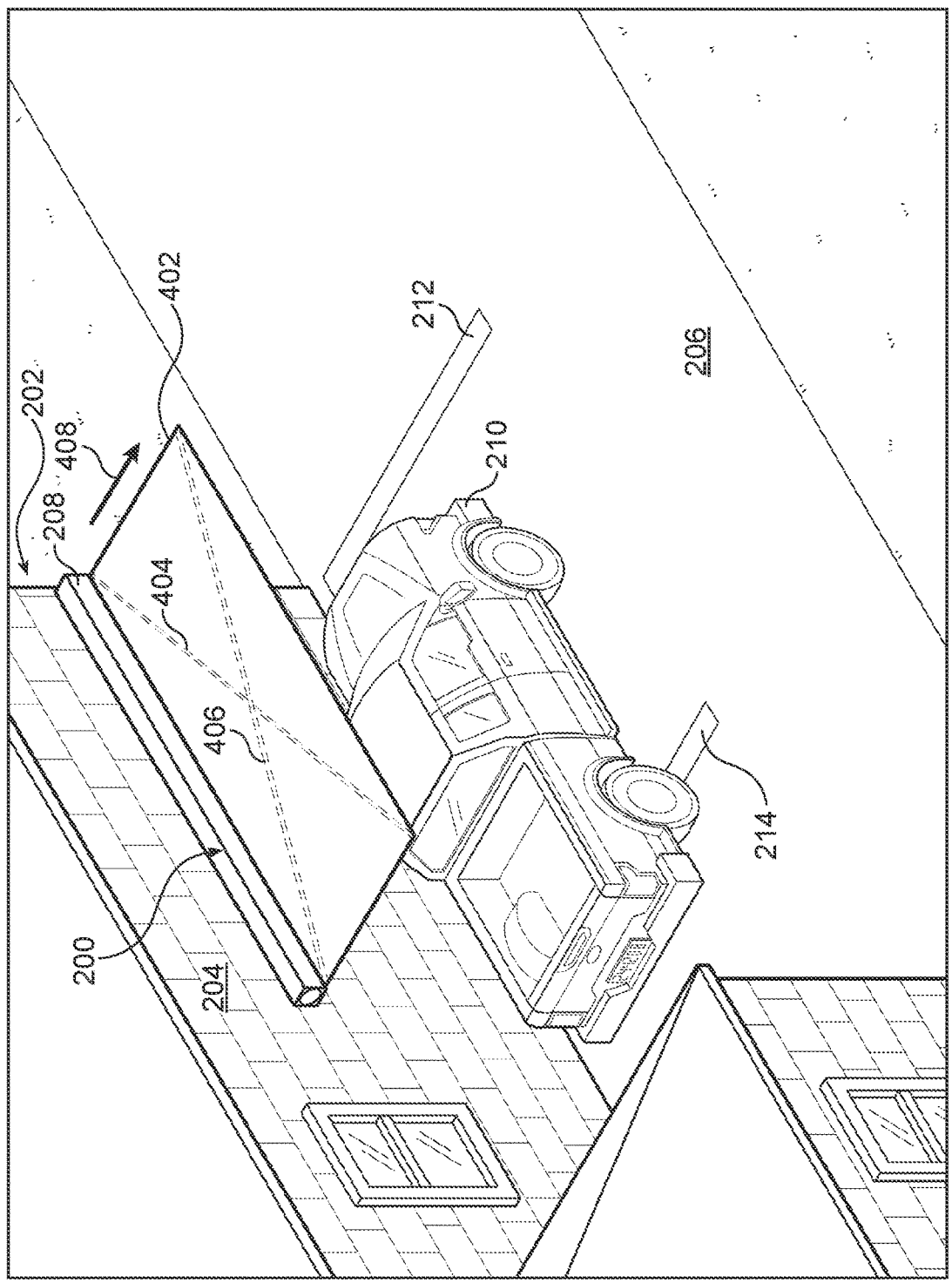
FIG. 4 is a representative view of an example embodiment of an awning being deployed in response to a weather event.

Referring now to FIG. 4, is a representative view of an example embodiment of deployable awning 200 being deployed in response to a weather event. In some embodiments, deployable awning 200 may be deployed in response to a determination of an activating event, such as a storm or other weather event. For example, deployable awning 200 may be deployed according to method 100 based on any of the factors or criteria, including combinations thereof, described in reference to FIG. 3. In this embodiment, deployable awning 200 has been deployed in response to an impending activating event, for example, a hail storm that is forecast or detected within the geographic area where house 202 having deployable awning 200 installed is located.

In this embodiment, deployable awning 200 is activated or deployed in response to the determination of an activating event. As part of the deployment of deployable awning 200, awning fabric 402 extends out from inside awning housing 208 where it has been kept in a stored configuration or position, for example, on one more rollers inside awning housing 208. Additionally, in some embodiments, deployable awning 200 may include support arms that are configured to hold awning fabric 402 taut in the deployed configuration or position. For example, as shown in FIG. 4, a first support arm 404 and a second support arm 406 extend approximately diagonally in opposite directions from awning housing 208 and provide a support structure to hold awning fabric 402 taut while deployable awning 200 is being deployed from the stored configuration or positon to the deployed configuration or position.

In this embodiment, deployable awning 200 is extending outwards in a first direction 408 from wall 204 of house 202. That is, awning fabric 402 is being unrolled or otherwise extended out of awning housing 208 to cover over vehicle 210 parked adjacent to wall 204 in driveway 206. With this arrangement, deployable awning 200 is configured to respond to an activating event to provide protection to vehicle 210 from a storm or other severe weather event.

Figure 5:
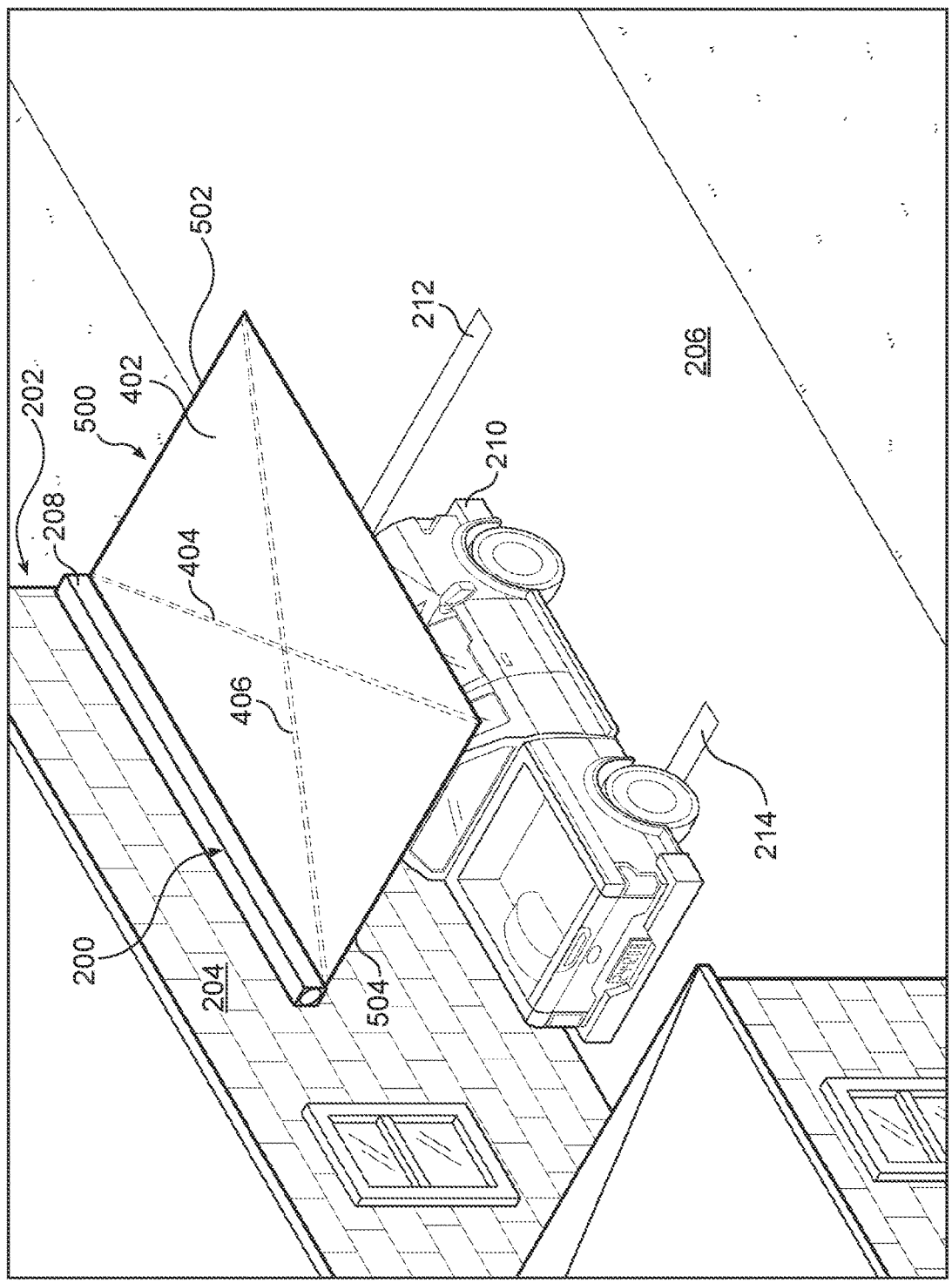
FIG. 5 is a representative view of an example embodiment of an awning in a fully deployed configuration.

Referring now to FIG. 5, deployable awning 200 is shown in a fully deployed position or configuration 500. In this embodiment, deployable awning 200 is in deployed configuration 500 such that awning fabric 402 is drawn out from inside awning housing 208 and covers vehicle 210. In this embodiment, awning fabric 402 is supported over vehicle 210 by first support arm 404 and second support arm 406. As shown in FIG. 5, the footprint or coverage area of deployable awning 200 in deployed configuration 500 is aligned with indicia located on driveway 206 adjacent or near wall 204 of house 202 where deployable awning 200 is mounted. In this embodiment, the indicia is first parking line 212 and second parking line 214 on driveway 206 that are aligned with edges of deployable awning 200. For example, a first edge 502 of deployable awning 200 is aligned with first parking line 212 and a second edge 504 of deployable awning 200 is aligned with second parking line 214. With this arrangement, the coverage area of deployable awning 200 in deployed configuration 500 may be indicated to a user so that the user's vehicle (e.g., vehicle 210) may be parked or stored beneath the coverage area and be protected from storm damage during an activating event.

As shown in FIG. 5, vehicle 210 is not parked between the indicia on driveway 206. For example, a portion of vehicle 210 extends over second parking line 214. As a result, vehicle 210 is not fully covered by deployable awning 200 in deployed configuration 500. That is, the portion of vehicle 210 that remains exposed outside of the coverage area of deployable awning 200 may be at risk from storm damage. In some embodiments, techniques for automatically adjusting a vehicle position in relation to deployable awning 200 may be used to protect the vehicle during a storm or other weather event.

Figure 6:
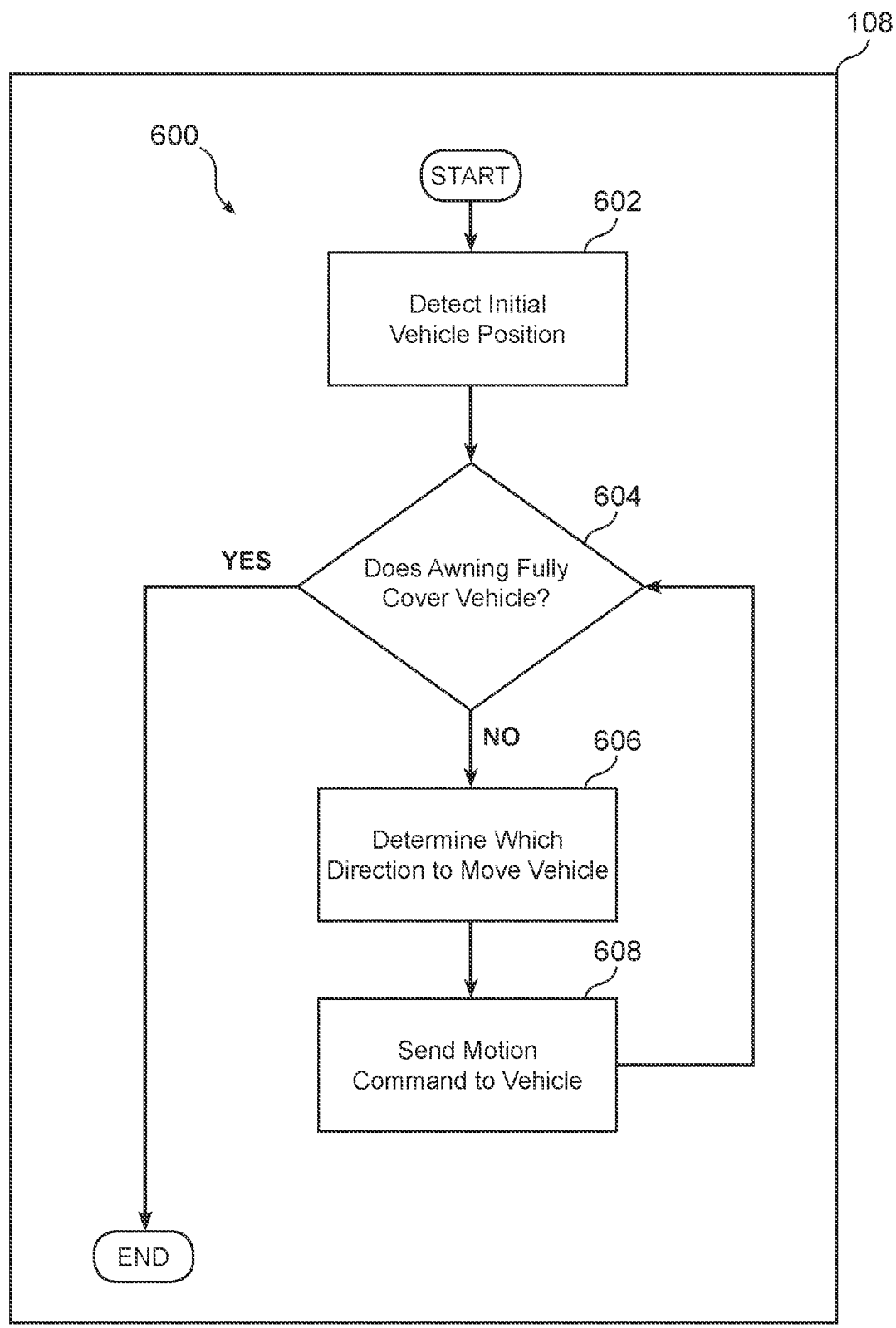
FIG. 6 is a flowchart of an example embodiment of a method of automatically adjusting a vehicle position in relation to an awning.

FIG. 6 is a flowchart of an example embodiment of a method 600 of automatically adjusting a vehicle position in relation to an awning. In some embodiments, method 600 may be part of operation 108 of method 100, described above. In an example embodiment, method 600 may be implemented by a computer or other component including a processor, such as the processor configured to control deployable awning 200 installed on house 202 to implement method 100. In this embodiment, method 600 begins with an operation 602. At operation 602, an initial position of a vehicle relative to the deployable awning is determined. For example, at operation 602, deployable awning 200 may use one or more sensors (e.g., sensors 702, 712 shown in FIG. 7) to detect and determine an initial position of vehicle 210 relative to deployable awning 200.

Next, method 600 proceeds to an operation 604 where whether or not the awning fully or completely covers the vehicle is determined. For example, at operation 604, whether vehicle 210 is fully within the coverage area of deployable awning 200 based on the indicia in the form of first parking line 212 and second parking line 214 located on driveway 206 can be determined. Upon determining at operation 604 that the vehicle is fully or completely covered by the awning (i.e., the result of operation 604 is YES), then method 600 ends. That is, if the vehicle is completely covered by the awning, no further adjustment of the vehicle position is needed.

Upon determining at operation 604, however, that the vehicle is not fully or completely covered by the awning (i.e., the result of operation 604 is NO), then method 600 proceeds to an operation 606. At operation 606, which direction the vehicle should be moved to be fully or completely covered by the awning is determined. For example, as shown in FIG. 5, vehicle 210 is short of first parking line 212 and extends over past second parking line 214. Therefore, based on the position of vehicle 210 in FIG. 5, operation 606 of method 600 determines that vehicle 210 should be moved forward (i.e., in a direction towards first parking line 212) so that vehicle 210 is completely covered by deployable awning.

Next, in response to determining the direction in which the vehicle should be moved at operation 606, method 600 includes an operation 608. At operation 608, a motion command is sent to the vehicle to automatically adjust the vehicle's position. At operation 608, the vehicle receiving the motion command includes an autonomous parking feature that permits the vehicle to move or adjust its position without requiring a human driver. With this configuration, the position of the vehicle relative to the coverage area provided by the deployable awning may be automatically adjusted so that the vehicle is fully covered by the awning and is thereby protected from storm damage.

Alternatively, at operation 608, the motion command may be sent to a user of the vehicle, for example, through an application on a user's mobile device to guide the user to move the vehicle to the appropriate location so that it is fully covered by the deployable awning.

Figure 7:
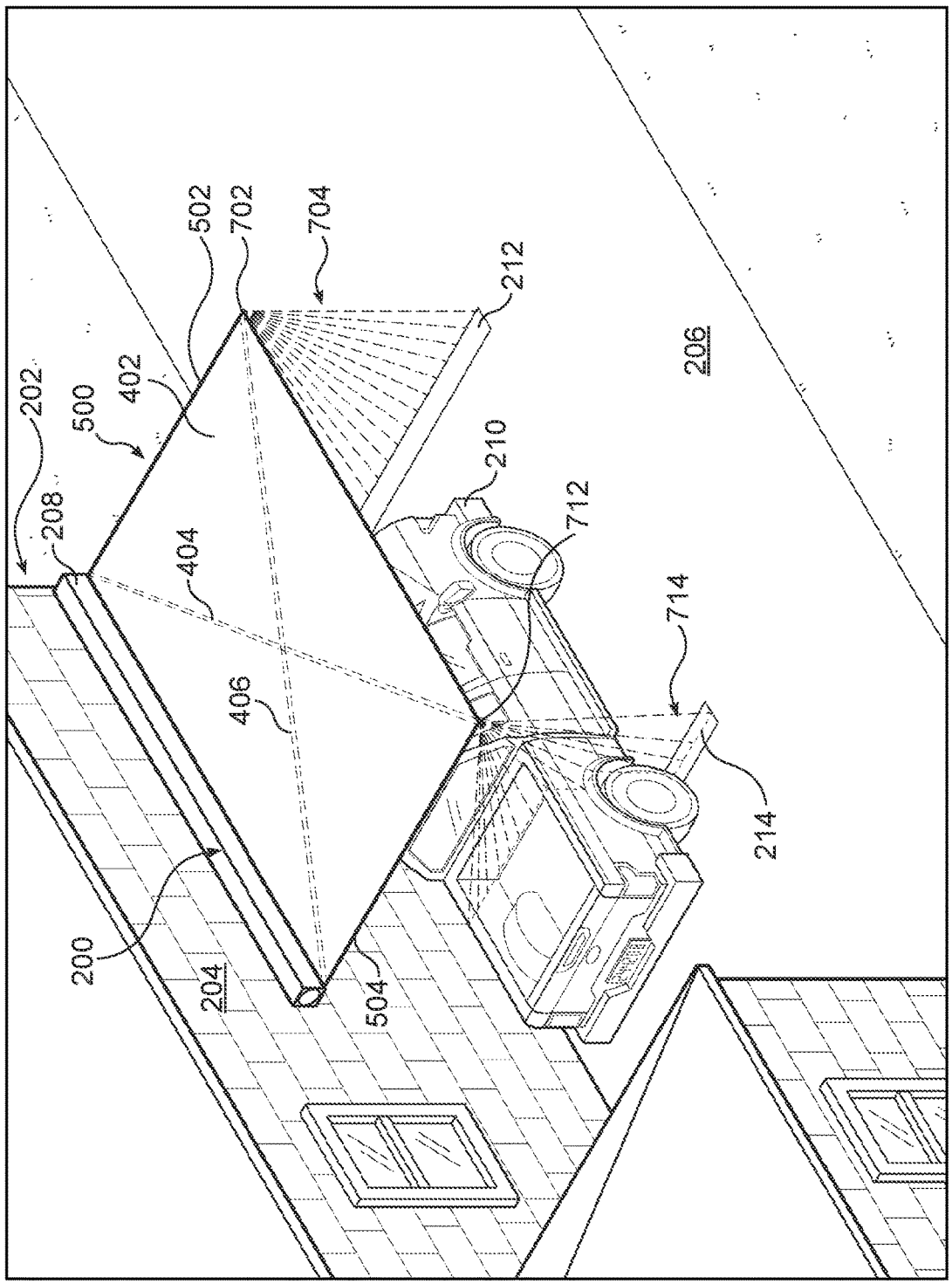
FIG. 7 is a representative view of an example embodiment of an awning determining whether a vehicle is covered.

Referring now to FIG. 7, an example embodiment of deployable awning 200 determining whether vehicle 210 is fully covered is shown. In some embodiments, deployable awning 200 includes one or more sensors that are configured to detect and determine a position of a vehicle relative to the position (i.e., coverage area) of deployable awning 200. In an example embodiment, deployable awning 200 includes at least a first sensor 702 disposed at one corner of deployable awning 200 on first edge 502 that is aligned with first parking line 212 and a second sensor 712 disposed at another corner of deployable awning 200 on second edge 504 that is aligned with second parking line 214. In one embodiment, first sensor 702 and second sensor 712 may be infrared beam sensors that detect an object (e.g., vehicle 210) within their beam. In other embodiments, first sensor 702 and/or second sensor 712 may be another type of sensor, such as an optical sensor or camera, that is configured to determine whether vehicle 210 is under deployable awning 200 (i.e., between first parking line 212 and second parking line 214).

In this embodiment, first sensor 702 transmits a first beam 704 towards first parking line 212 on driveway 206 and second sensor 712 transmits a second beam 714 towards second parking line 214 on driveway 206. As shown in FIG. 7, vehicle 210 is not fully covered by deployable awning 200. Accordingly, in this embodiment, second beam 714 of second sensor 704 at the corner of second edge 504 on deployable awning 200 detects the presence of a portion of vehicle 210. As described above with reference to method 600, vehicle 210 needs to move forward in a direction towards first parking line 212 to be fully or completely covered by deployable awning 200.

Figure 8:
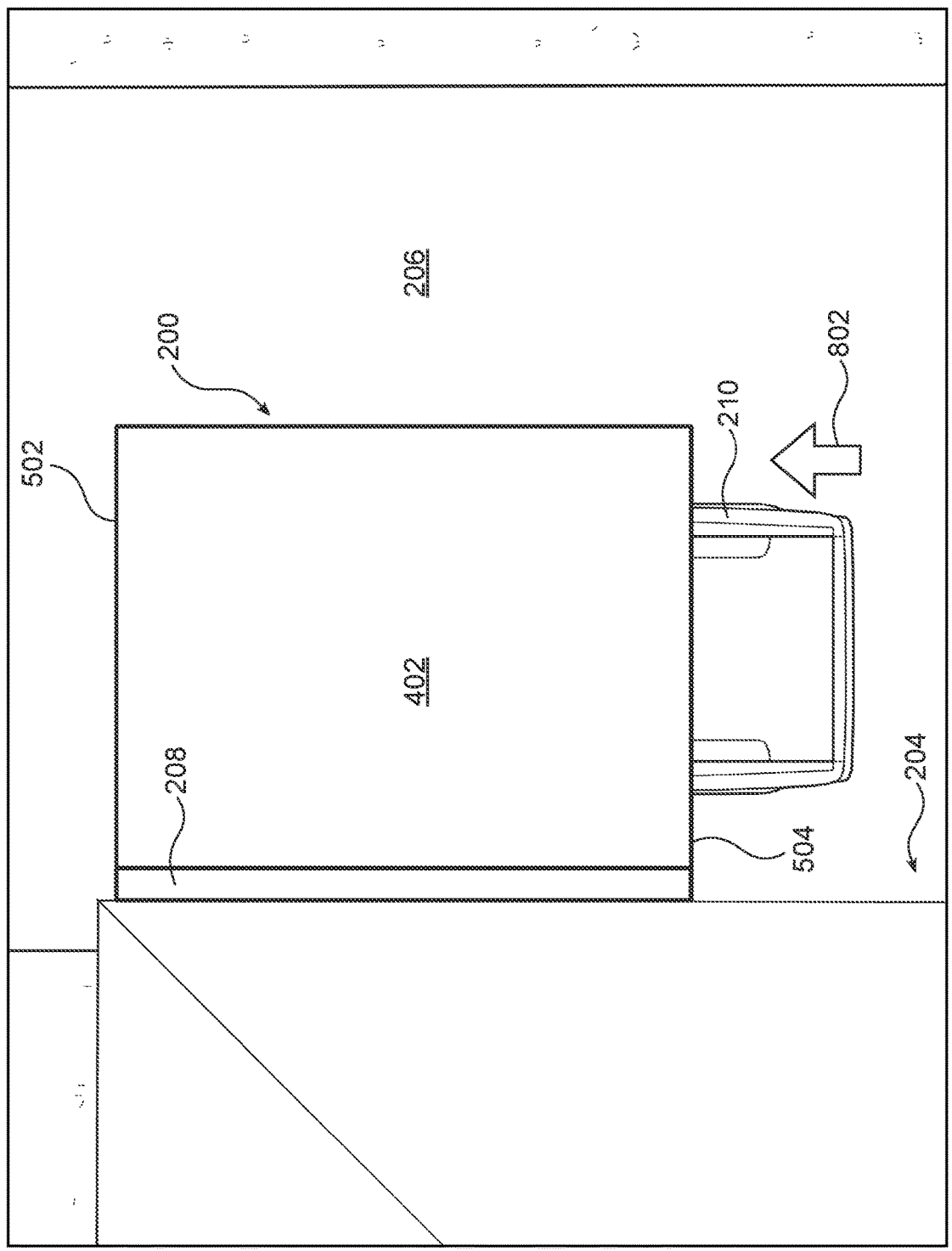
FIG. 8 is a top-down representative view of an example embodiment of a vehicle automatically adjusting its position in relation to an awning.

FIG. 8 is a top-down representative view of an example embodiment of vehicle 210 automatically adjusting its position in relation to deployable awning 200. In this embodiment, vehicle 210 receives a motion command (e.g., as part of operation 608 of method 600) to move forward in a direction 802 towards first parking line 212 which is aligned with first edge 502 of deployable awning 200. For example, vehicle 210 may be associated with an autonomous parking feature that allows vehicle 210 to be moved without requiring a human driver. With this arrangement, the position of vehicle 210 may be automatically adjusted relative to the coverage area provided by deployable awning 200 so that vehicle 210 is fully covered beneath awning fabric 402 and is protected from storm damage.

Figure 9:
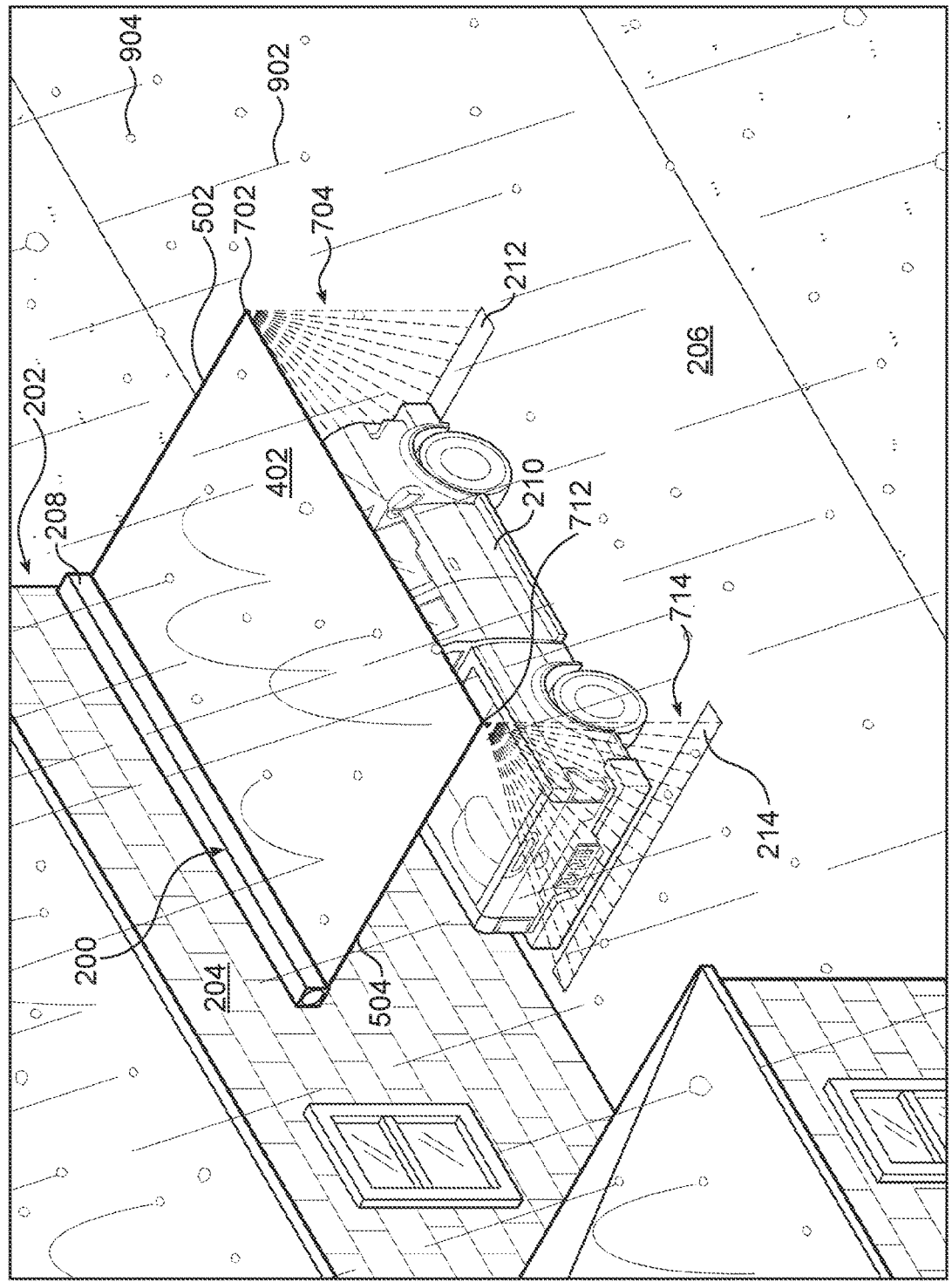
FIG. 9 is a representative view of an example embodiment of a vehicle protected by an awning during a weather event.

For example, as shown in FIG. 9, an example embodiment of vehicle 210 protected by awning 200 during a weather event is illustrated. In this embodiment, vehicle 210 is fully covered by deployable awning 200, which has extended out from housing 208 on wall 204 of house 202 to the deployed configuration in response to an activating event in the form of a hail storm 902. As a result, a plurality of hail 904 from hail storm 902 impacts awning fabric 402 of deployable awning 200 in the deployed configuration instead of impacting vehicle 210. With this configuration, vehicles are automatically protected from damage caused by storms or other weather events by the deployable awning of the example embodiments.

In some embodiments, the deployable awning according to the techniques described herein may be configured to automatically return to the stored configuration or position upon completion or conclusion of the activating event. That is, once the storm or other weather event is over, the deployable awning can automatically retract inside its housing. Referring now FIG. 10, a flowchart of an example embodiment of a method 1000 of returning an awning to a stored configuration after a weather event is shown. In this embodiment, method 1000 includes an operation 1002. At operation 1002, the awning is in a deployed configuration or position. For example, as described above in reference to method 100, deployable awning 200 may have been deployed in response to an activating event, such as a storm or other weather event (e.g., hail storm 902 shown in FIG. 9). As a result of the activating event, deployable awning 200 has extended awning fabric 402 out from wall 204 of house 202 to cover vehicle 210.

Next, method 1000 may proceed to an operation 1004. At operation 1004, whether or not the activating event has concluded is determined. For example, at operation 1004, one or more factors or criteria that were used to determine the start or commencement of the activating event (e.g., as part of operation 104 and/or process 300, described above) may also be used to determine the completion or conclusion of the activating event. Upon determining at operation 1004 that an activating event has not yet concluded (i.e., the decision is NO), then method 1000 returns to the beginning where the awning remains in the deployed position. Thus, upon the negative determination at operation 1004, method 1000 returns to operation 1002 until such time as the activating event ends (i.e., the storm is over).

In some embodiments, a time delay of a predetermined time period may be initiated before method 1000 proceeds again to operation 1004 to determine whether the activating event has concluded. For example, the predetermined time period may be measured in minutes or hours. Upon expiration of the predetermined time period, then method 1000 may again proceed to operation 1004 to determine if the activating event has concluded. With this arrangement, method 1000 is configured to periodically check on the status of an activating event at operation 1004 until the storm or other weather event in the geographic area where the awning is installed has ended.

Upon determining at operation 1004 that an activating event has concluded (i.e., the decision is YES), then method 1000 proceeds to an operation 1006. At operation 1006, the awning is automatically returned to its stored position or configuration. For example, at operation 1006, deployable awning 200 may be automatically stored in response to the conclusion of an activating event, such as a storm or other weather event, to retract awning fabric 402 and the associated support arms (e.g., first support arm 404 and second support arm 406) back inside awning housing 208 mounted to wall 204 of house 202. With this configuration, method 1000 may be used to automatically retract and store the deployable awning once the storm or other weather event is over.

Additionally, in some embodiments, the deployable awning may be retracted from the deployed position or configuration back into the stored position or configuration upon manual activation by a user.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. A method for automatically deploying an awning in response to a weather event, the method comprising:
    determining that an activating event has occurred, wherein the activating event includes a storm or other weather event;
    upon determining that the activating event has occurred, automatically deploying an awning from a stored configuration inside an awning housing to a deployed configuration such that the awning covers a coverage area of a ground surface adjacent to a location where the awning housing is mounted;
    wherein the awning is part of a networked system with a plurality of other deployable awnings; and
    wherein determining that the activating event has occurred includes receiving notification from at least one neighboring deployable awning of the plurality of other deployable awnings located within a predetermined area that the at least one neighboring deployable awning has deployed.

2. The method according to claim 1, wherein the awning housing is mounted to a wall of a building.

3. The method according to claim 1, wherein determining that the activating event has occurred further includes one or more of receiving information indicating that a storm or other weather event is in a geographic area where the awning is located, receiving information associated with an emergency broadcast, or receiving information from at least one sensor associated with the awning.

4. The method according to claim 1, further comprising:
    determining that the activating event has concluded; and in response to determining the activating event has concluded, automatically retracting the awning from the deployed configuration back to the stored configuration inside the awning housing.

5. The method according to claim 1, wherein awnings of the networked system communicate notifications over a wireless communication network.

6. The method according to claim 1, wherein the ground surface includes an indicia that corresponds to the coverage area of the awning.

7. The method according to claim 6, wherein the indicia includes a pair of parking lines on the ground surface; and
wherein a location of the pair of parking lines aligns with edges of the awning in the deployed configuration.

8. The method according to claim 1, further comprising:
automatically adjusting a position of a vehicle relative to the coverage area of the awning.

9. The method according to claim 8, further comprising:
determining the position of the vehicle using at least one sensor disposed at a corner of the awning in the deployed configuration.

10. The method according to claim 9, wherein the at least one sensor comprises an optical sensor or camera that determines whether the vehicle is located under the awning in the deployed configuration.

11. A system for automatically deploying an awning in response to a weather event, the system comprising:
an awning comprising an awning housing, an awning fabric, and multiple support arms, wherein the awning fabric is stored inside the awning housing in a stored configuration;
at least one processor associated with the awning, the at least one processor configured to:
determine that an activating event has occurred, wherein the activating event includes a storm or other weather event;
upon determining that the activating event has occurred, automatically deploy the awning fabric from the stored configuration inside the awning housing to a deployed configuration such that the awning fabric covers a coverage area of a ground surface adjacent to a location where the awning housing is mounted;
wherein the awning is part of a networked system with a plurality of other deployable awnings; and
wherein the at least one processor is configured to determine that the activating event has occurred by receiving notification from at least one neighboring deployable awning of the plurality of other deployable awnings located within a predetermined area that the at least one neighboring deployable awning has deployed.

12. The system according to claim 11, wherein the awning housing is mounted to a wall of a building.

13. The system according to claim 11, wherein the processor is further configured to:
determine that the activating event has concluded; and
in response to determining the activating event has concluded, automatically retract the awning fabric from the deployed configuration back to the stored configuration inside the awning housing.

14. The system according to claim 11, wherein awnings of the networked system communicate notifications over a wireless communication network.

15. The system according to claim 11, wherein the ground surface includes an indicia that corresponds to the coverage area of the awning.

16. The system according to claim 15, wherein the indicia includes a pair of parking lines on the ground surface; and
wherein a location of the pair of parking lines aligns with edges of the awning in the deployed configuration.

17. The system according to claim 11, wherein the processor is further configured to:
automatically adjust a position of a vehicle relative to the coverage area of the awning.

18. The system according to claim 17, further comprising:
at least one sensor disposed at a corner of the awning in the deployed configuration; and
wherein the processor is configured to determine the position of the vehicle using the at least one sensor.

19. The system according to claim 18, wherein the at least one sensor comprises an optical sensor or camera that determines whether the vehicle is located under the awning in the deployed configuration.

* * * * *